No. 713,036. Patented Nov. 4, 1902.
C. L. WILMOT.
PIPE COUPLING.
(Application filed Mar. 28, 1901.)
(No Model.)

WITNESSES
INVENTOR
Clarence L. Wilmot
by Bakewell & Bakewell
his attys.

UNITED STATES PATENT OFFICE.

CLARENCE L. WILMOT, OF PITTSBURG, PENNSYLVANIA, ASSIGNOR TO CARNEGIE STEEL COMPANY, OF PITTSBURG, PENNSYLVANIA, A CORPORATION OF PENNSYLVANIA.

PIPE-COUPLING.

SPECIFICATION forming part of Letters Patent No. 713,036, dated November 4, 1902.

Application filed March 28, 1901. Serial No. 53,267. (No model.)

*To all whom it may concern:*

Be it known that I, CLARENCE L. WILMOT, of Pittsburg, in the county of Allegheny and State of Pennsylvania, have invented a new and useful Pipe-Coupling, of which the following is a full, clear, and exact description, reference being had to the accompanying drawings, forming part of this specification, in which—

Figure 1:
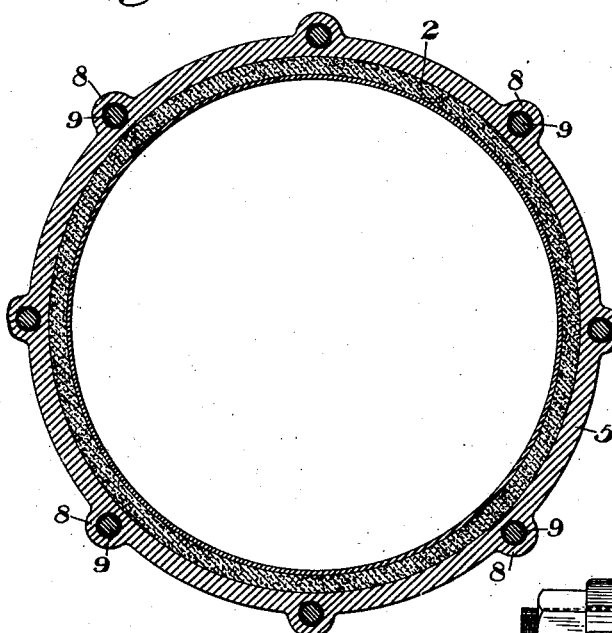
Figure 2:
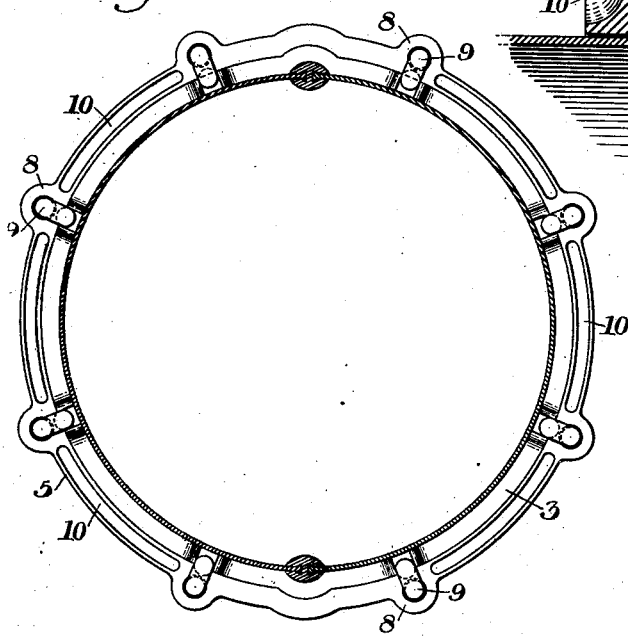
Figure 4:
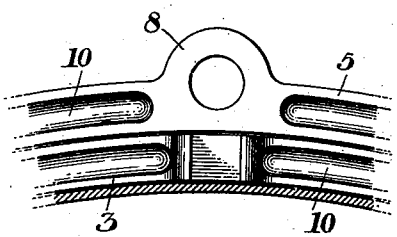
Figure 3:
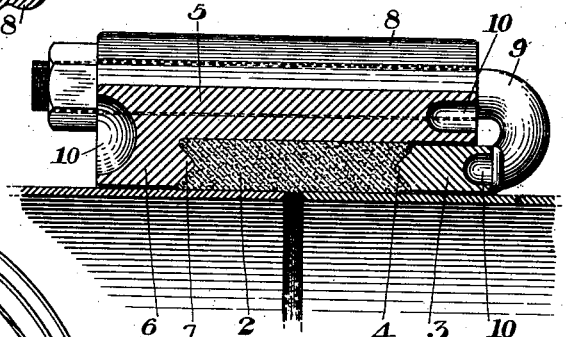
Figure 5:
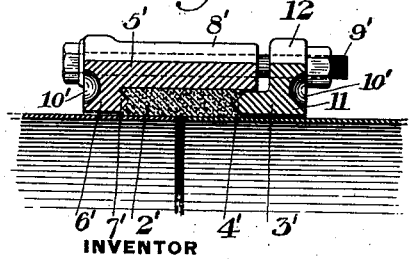

Figure 1 is a central cross-section of a joint provided with my improved coupling. Fig. 2 is an end elevation of the joint with the pipe in section. Fig. 3 is an enlarged transverse section showing a portion of the joint. Fig. 4 is a broken detail view showing the outer face of the coupling-ring; and Fig. 5 is a view similar to Fig. 3, showing a modified form arranged for use with ordinary bolts.

My invention relates to couplings employed for connecting the ends of thin or light walled tubing; and its object is to provide a simple, cheap, and efficient coupling which can be easily applied and removed without disturbing other joints of the pipe.

To that end it consists in a compressible ring or gasket, a compressing-ring having an annular projection to engage and expand or distort the gasket, and a coupling-ring engaging the opposite face of the gasket and connected with the compressing-ring.

It also consists in the construction and arrangement of the parts, as hereinafter more fully described, and set forth in the claim.

In the drawings, referring to the forms of Figs. 1 to 4, inclusive, 2 represents a compressible gasket or packing-ring, which may be made in one or more pieces and is preferably formed of rubber or rubber composition. This ring is arranged to fit neatly around the registering edges of the pipes, and against one of its end faces is pressed a compressing-ring 3, having an annular projection 4, preferably of general V-form, which is forced into the gasket to compress and distort it evenly against the pipe.

An outer metal coupling-ring 5 surrounds the gasket and at least a portion of the compressing-ring and is provided with an inwardly-projecting ring portion 6, having an angular projection 7, arranged to engage the end face of the gasket. The coupling-ring is provided with hollow ribs or bosses 8 to receive hook-bolts 9, the hook portions of which engage the outer portion of the compressing-ring. The coupling-ring and the compressing-ring may both be cored out or provided with arc-shaped recesses 10, which serve to lighten these parts and reduce their cost. The bosses or hollow ribs also serve this same purpose and enable the coupling-ring to be made of less thickness than would otherwise be possible.

In using the device the coupling parts are assembled about the ends of the pipe in the manner shown in Fig. 3, and the nuts being screwed up the projections on the coupling-ring and compressing-ring are forced into the gasket, distorting and compressing it against the end portion of the pipe and effectually sealing the joint.

In Fig. 5 I show a modified form wherein the compressing-ring 3' is provided with an outwardly-extending flange portion 11, having perforated bosses 12 to receive ordinary straight bolts 9'. Otherwise this form is similar to that of the preceding figure, the action being the same in both cases.

The advantages of my invention result from the simplicity and small number of parts of the coupling and from the effective sealing of the joint and the ease of removing and replacing without disturbing the other joints along the line.

The metal rings of the coupling may be made in one or more parts, and the form and size of the several parts, together with their material, may be varied without departing from my invention.

I claim—

A pipe-coupling comprising a compressible gasket arranged to surround the joint, a coupling-ring of greater width than the gasket and surrounding it, said coupling-ring having an inwardly-projecting annulus engaging an end face of the gasket, an annular compressing-ring between the coupling-ring and the pipe and having an annular projection arranged to be forced into the gasket and hook-bolts extending through the coupling-ring with their hooked ends engaging with the compressing-ring; substantially as described.

In testimony whereof I have hereunto set my hand.

CLARENCE L. WILMOT.

Witnesses:
H. M. CORWIN,
G. B. BLEMING.